United States Patent [19]

Shaw et al.

[11] Patent Number: 4,971,435
[45] Date of Patent: Nov. 20, 1990

[54] 3-D MOTION PICTURE PROJECTION APPARATUS

[75] Inventors: William C. Shaw, Streetsville; Marian Toporkiewicz, Toronto, both of Canada

[73] Assignee: Imax Systems Corporation, Toronto, Canada

[21] Appl. No.: 404,473

[22] Filed: Sep. 8, 1989

[51] Int. Cl.$^5$ ............................................. G03B 35/00
[52] U.S. Cl. ........................................ 352/59; 352/60; 352/62; 352/63; 352/215
[58] Field of Search ...................... 352/57, 60, 62, 63, 352/59, 215

[56] References Cited

U.S. PATENT DOCUMENTS

| | | |
|---|---|---|
| 2,810,318 | 10/1957 | Dockhorn . |
| 3,186,003 | 5/1965 | Gregory . |
| 3,232,690 | 2/1966 | Babcock . |
| 3,236,581 | 2/1966 | Mitchell . |
| 3,300,271 | 1/1967 | Yamamoto . |
| 3,304,146 | 2/1967 | Gottschalk . |
| 3,357,778 | 12/1967 | Hillmann . |
| 3,363,967 | 1/1968 | Schmitt . |
| 3,394,981 | 7/1968 | Jotzoff . |
| 3,463,582 | 8/1969 | Buck . |
| 3,494,524 | 2/1970 | Jones . |
| 3,531,194 | 9/1970 | Roppel et al. . |
| 3,549,249 | 12/1970 | Katsuyama . |
| 3,598,481 | 8/1971 | Mitchell . |
| 3,600,073 | 8/1971 | Shaw . |
| 3,602,585 | 8/1971 | Roppel . |
| 3,612,671 | 10/1971 | Wermeille . |
| 3,637,301 | 1/1972 | Nakayama . |
| 3,644,025 | 2/1972 | Katsuyama . |
| 3,644,026 | 2/1972 | Toda . |
| 3,692,395 | 9/1972 | Iiada . |
| 3,773,412 | 11/1973 | Yang . |
| 3,775,002 | 11/1973 | Moriyama . |
| 3,779,633 | 12/1973 | Ichiyanagi . |
| 3,784,293 | 1/1974 | Yang . |
| 3,843,243 | 10/1974 | Takigawa . |
| 3,885,864 | 5/1975 | Friesen . |
| 3,936,168 | 2/1976 | Schild . |
| 3,944,349 | 3/1976 | Jones . |
| 3,951,531 | 4/1976 | Nakai . |
| 4,257,693 | 3/1981 | Hirata . |
| 4,284,332 | 8/1981 | Sekine . |
| 4,330,183 | 5/1982 | Kastner . |
| 4,365,877 | 12/1982 | Shaw . |
| 4,424,529 | 1/1984 | Roese et al. . |
| 4,441,796 | 4/1984 | Shaw . |
| 4,547,051 | 10/1985 | Swinehart . |
| 4,576,456 | 3/1986 | Okino . |
| 4,592,632 | 6/1986 | Renold . |
| 4,637,701 | 1/1987 | Yanaguchi . |
| 4,643,548 | 2/1987 | Swinehart . |
| 4,669,841 | 6/1987 | Horio . |
| 4,699,483 | 10/1987 | Swinehart . |

*Primary Examiner*—Monroe H. Hayes
*Attorney, Agent, or Firm*—Rogers, Bereskin & Parr

[57] ABSTRACT

In an alternate eye 3-D motion picture projection apparatus of the rolling loop type, light projection is accomplished by the combination of focal plane shutters that are coupled to the rotor of the projector and a supplementary shutter arrranged to trim the projected light so that discrete "left eye" and "right eye" images are projected. Various embodiments are disclosed in which a rotary blade shutter is located at the stop of the projection lens. Where there are two projection lenses, a single blade or two counter-rotating blades trim the light projected through both lenses.

12 Claims, 6 Drawing Sheets

3-D MOTION PICTURE PROJECTION APPARATUS

FIELD OF THE INVENTION

This invention relates generally to the presentation of stereoscopic or three-dimensional motion pictures (hereafter called 3-D motion pictures). More particularly the invention is concerned with a 3-D motion picture projection apparatus which is designed to enhance the quality of 3-D presentation.

BACKGROUND OF THE INVENTION

Many attempts have been made to produce 3-D motion pictures. The technique generally used involves simultaneously photographing a subject using two motion picture cameras positioned to provide left and right eye views of the subject. The images recorded on films in those cameras are then simultaneously projected onto a screen and are optically coded in some way so that the left eye of a viewer sees only the images that were recorded by the "left eye" camera while the viewer's right eye sees only the "right eye" images. The viewer then perceives a stereoscopic or 3-D effect.

Coding of the images may be effected by the use of what are in effect shuttered spectacles worn by a viewer. The shutters effectively block and unblock the view from each eye alternately in timed relation to projection of the images onto the screen so that the viewer's right eye is blocked when left eye images appear and vice versa. This technique is referred to as "alternate eye" 3-D and is discussed, for example, in U.S. Pat. No. 4,424,529 (Roese et al.).

Spectacular 3-D motion pictures can be made using large format films such as those that are available from Imax Systems Corporation of Toronto, Canada under the registered trade marks IMAX and OMNIMAX. The use of large format films has become possible as a result of development of the so-called "rolling loop" film transport mechanism for cameras and projectors. U.S. Pat. No. 3,494,524 to Jones discloses the principle of a rolling loop transport mechanism. A number of improvements in the original Jones mechanism are disclosed in U.S. Pat. Nos. 3,600,073, 4,365,877 and 4,441,796 (all to Shaw). All of these patents have been assigned to Imax Systems Corporation.

Essentially, the rolling loop mechanism includes a curved stator and a rotor which co-operate to define a passage through which the film is transported. The rotor has gaps in which loops of film are continuously formed as the rotor rotates. Each loop is developed by feeding film from an input sprocket into one of the rotor gaps as the gap travels from a film inlet location to an aperture in the stator. The loop then decays progressively as the gap travels from the aperture to a driven output sprocket. At the position of the aperture the film is held stationary on a registration pin or pins. In a projector, the stationary film is illuminated by a light source and the image is projected onto a screen.

U.S. Pat. No. 3,944,349 (Jones) discloses a focal plane shutter assembly for a rolling loop projector which includes a plurality of curved shutter plates. Each of the gaps in the rotor is bridged by one of the shutter plates so that light passing through the film is cut off as the gap passes the aperture. In the interests of high illumination efficiency, the plates are narrower than the aperture. However, a consequence of this shutter design is that, in alternate eye 3-D projection from two projectors or from a single, double film/double lens projector, portions of both "left eye" and "right eye" images would appear on the screen at the same time. This would seriously detract from the quality of the 3-D image presentation.

SUMMARY OF THE INVENTION

An object of the present invention is to provide an improvement in a 3-D motion picture projection apparatus which is designed to avoid this problem in a rolling loop type of projector.

According to the invention, there is provided a 3-D motion picture projection apparatus for alternately projecting image from respective series of corresponding "left eye" and "right eye" images. The apparatus includes at least one rolling loop film transport mechanism, a light source and a projection lens assembly. The mechanism includes a stator having an aperture, a rotor which cooperates with the stator to define a film passage and which has gaps for receiving film loops, and at least one primary shutter coupled to the rotor and bridging a said gap for interrupting light from the light source that is projected through the aperture as the rotor rotates. Supplementary shutter means is provided to modify the shuttering effect of the primary shutter so that projection of light through each image in one series is terminated before commencement of projection of light through the next succeeding image of the other series. This results in the projection of discrete "left eye" and "right eye" images.

In other words, the supplementary shutter means "trims" the light that is normally projected by a rolling loop type of projector so that projection of one image is terminated before projection of the next succeeding image begins. In this way, clear high quality 3-D images are obtained. The normal "primary" shutters of the projector are retained in order to shield the film from a significant portion of the intense heat of the projection light source.

Preferably, the supplementary shutter means is located at the "stop" of the projection lens, where the "light bundle" projected from the light source is at its smallest diameter.

The projection apparatus may take various forms. For example, it may be a single projector for receiving a film strip in which the "left eye" and "right eye" images appear alternately on the same film strip. Alternatively, the respective series of images may be projected from separate film strips, either using two separate projectors, or a single projector having two rotors stacked one above the other. In either of the two latter configurations, there will be two projection lens assemblies and each assembly will be provided with its own supplementary shutter means. Of course, the two supplementary shutter means will be synchronized with one another and with the respective projectors or rotors so that the light projected through both of the film strips is appropriately "trimmed" to achieve the required discrete images.

Preferably, the supplementary shutter means takes the form of one or more rotary shutters arranged to intermittently block the light bundle projected through the associated projection lens. As will be described in more detail later, the rotary shutter may comprise a single rotatable disk or two counter-rotatable disks. The disks will be appropriately configured with apertured or open sectors and non-apertured or closed sectors for respectively unblocking and blocking the projected light. In an apparatus having two projection lenses, each lens may be provided with its own separate rotary shutter or a single shutter may be used to simultaneously trim the light in both lenses.

BRIEF DESCRIPTION OF DRAWINGS

In order that the invention may be more clearly understood, reference will now be made to the accompanying drawings which illustrate a number of preferred embodiments of the invention by way of example, and in which:

FIG. 3 shows an "ideal" situation with perfectly discrete "instantaneous" images;

FIG. 4 shows overlapping images such as would occur without the supplementary shutter means of the present invention;

FIG. 5 shows the graphs of FIG. 4 modified by the shutter means of the present invention;

FIG. 9a is a view similar to FIG. 8 showing a different form of shutter, while FIG. 9b shows the light pattern that is achieved with the shutter of FIG. 9a;

DESCRIPTION OF PREFERRED EMBODIMENTS

Figure 1:
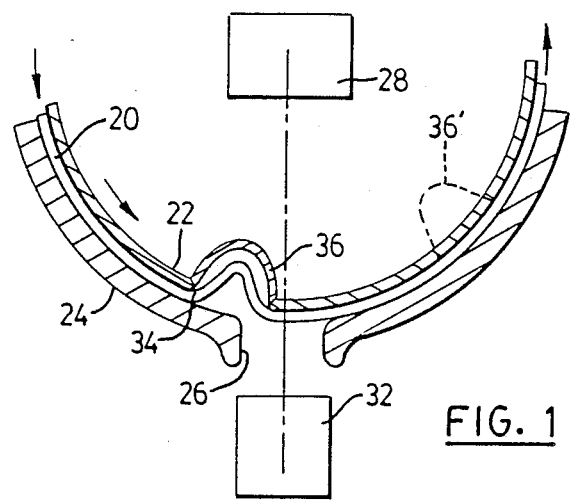
FIG. 1 is a diagrammatic plan view illustrating the principal components of a film projector of the rolling loop type.
Figure 2:
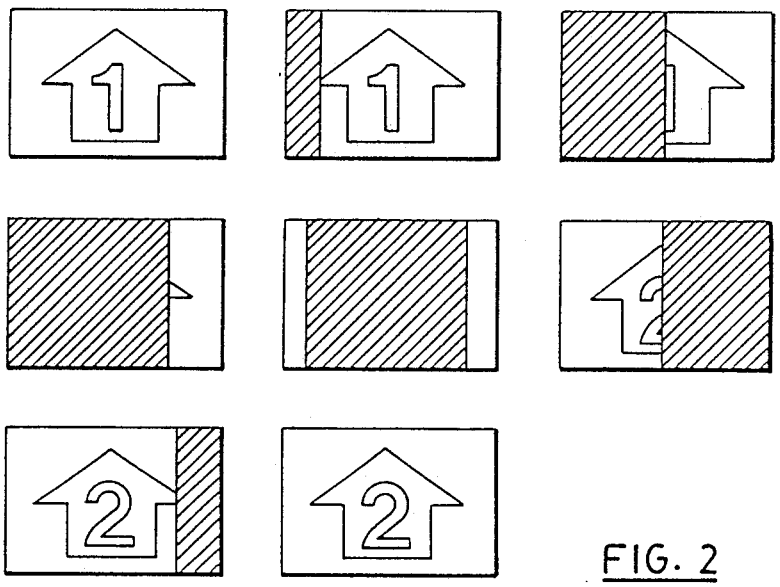
FIG. 2 is a sequence of drawings showing how the primary shutters of a projector of FIG. 1 progressively cover a projected image and then uncover the next succeeding image.

Reference will first be made to FIGS. 1 and 2 in describing the normal shutter action that takes place in a rolling loop projector. It is to be understood that FIG. 1 shows only the principal components of the projector that are necessary to understanding the shuttering effect. Reference may be made to the Jones U.S. Pat. No. 3,944,349 discussed previously for a full description of the shutter.

As seen in FIG. 1, a film 20 is fed into a film passage between a rotor 22 and a stator 24 at a predetermined rate by a driven inlet sprocket (not shown) and is drawn from the mechanism by an outlet sprocket (also not shown) at the same predetermined rate. Rotor 22 is driven at constant speed inside stator 24 and the stator includes an aperture 26. Reference numeral 28 indicates a lamphouse provided with a projection light source from which light is directed towards aperture 26. A projection lens assembly for projecting the light onto a screen is indicated at 32.

Rotor 22 has a number of equally spaced gaps, one of which is indicated at 34. Film loops are formed in these gaps and these loops move one frame length each time a loop passes a stationary locating pin on the stator (not shown). Each loop is developed continuously in the associated rotor gap by the driven input sprocket as the gap travels to the aperture 26 and the loop decays continuously as it travels from the aperture.

Rotor 22 is designed to support the film at its to and bottom edges and permit light to be projected through the film as it travels past the aperture 26. Each rotor gap is provided with a primary shutter comprising a plate 36 which bridges the gap in the rotor so as to cut off the light passing through the film as the gap passes the aperture. Plate 36 is shown as curved but may be of angular or other appropriate shape. Movement of the gap past the aperture coincides with transportation of the film from one frame to the next at the location of the aperture so that the shutter obscures the projected light during the change from one frame to the next. Normally, each gap in the rotor is provided with a shutter plate and additional "flicker" shutters are placed midway between each pair of gaps, for example as indicated at 36' in FIG. 1. Each frame is projected twice, as first a primary shutter and then a secondary shutter cuts off the light passing through the aperture.

In the interests of high illumination efficiency, each shutter plate is narrower than the width of the aperture 26; the shutter therefore never completely obscures the projected image. FIG. 2 shows a sequence of diagrams that illustrate the shuttering effect. The diagrams appear in sequence from left to right beginning at the top. As seen in that diagram, an image 1 is fully illuminated on the screen. As shutter 36 begins to move across aperture 26 (the condition illustrated in FIG. 1) the shutter begins to cover the image starting from the left-hand side. The center diagram shows the image when the shutter is centrally positioned with respect to aperture 26. It will be seen that light is visible at both edges, the light at the right-hand edge being a part of image 1 while the light at the left-hand edge is part of image 2. Succeeding diagrams show the shutter continuing to move across the aperture until image 2 is fully illuminated.

In a conventional non-3-D projection system, this shutter arrangement is advantageous in that it provides a high illumination efficiency. However, since each image is not projected discretely, the conventional rolling loop projector is not ideally suited to alternate eye 3-D projection. It has been recognized that, for proper 3-D realism, the "left eye" and "right eye" images must be presented individually and with no overlap.

Figure 3:
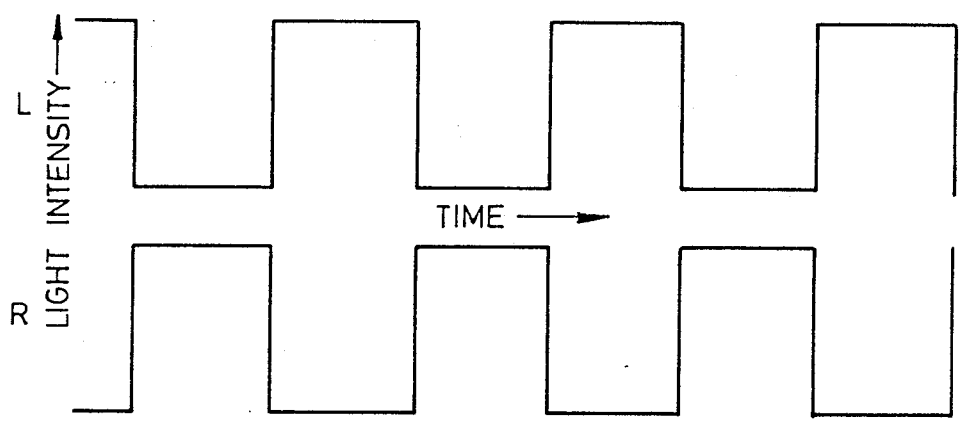
FIGS. 3, 4 and 5 each comprise a pair of graphs of light intensity against time for respective series of "left eye" and "right eye" projected images in an alternate eye 3-D projection system.

FIG. 3 shows "left eye" and "right eye" time versus light intensity graphs that would result from an ideal projection system in which the respective images are presented discretely and with no overlap and in which the images appear and disappear instantly. When the light intensity for the left eye graph is at 0, the light intensity for the right eye graph is at a maximum and there is instantaneous cut-off between the individual minima and maxima at the same instant.

Figure 4:
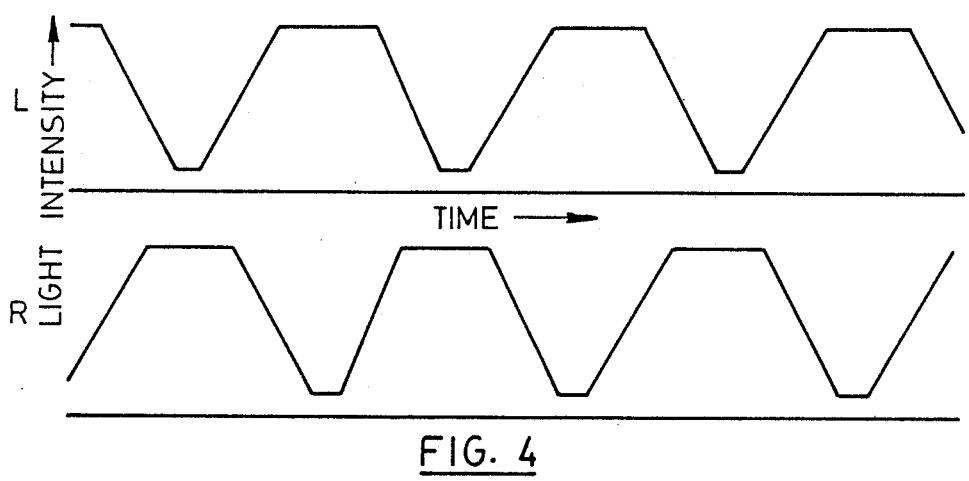

FIG. 4 shows similar graphs for light projected from two conventional rolling loop projectors. It will be seen that there is substantial overlap between the projected left eye and right eye images and that, for each series of images, the transitions between successive minima and maxima are quite gradual slopes.

Figure 5:
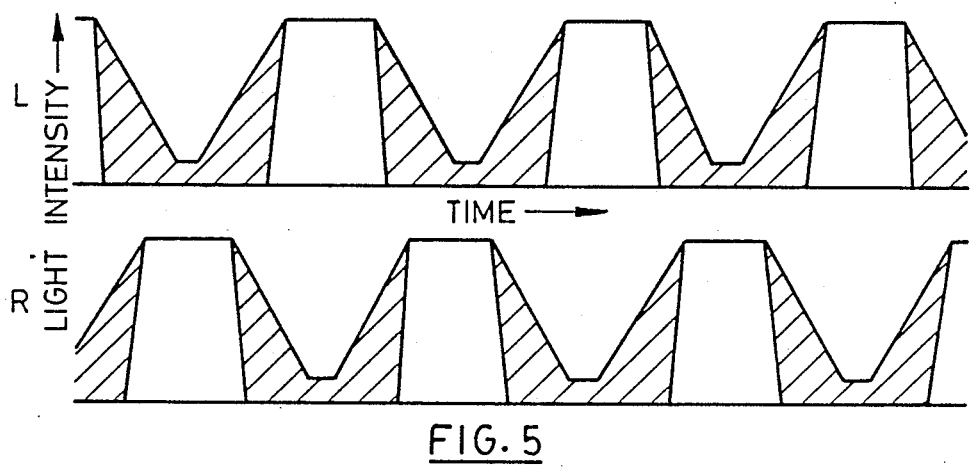

FIG. 5 shows the two graphs of FIG. 4 modified by the supplementary shutter means of the present invention. The cross-hatched areas show what might be termed "unwanted" light that is eliminated by the supplementary shutter means. It will be seen that the resulting, modified graphs approach quite closely the "ideal" graphs shown in FIG. 3.

Figure 6:
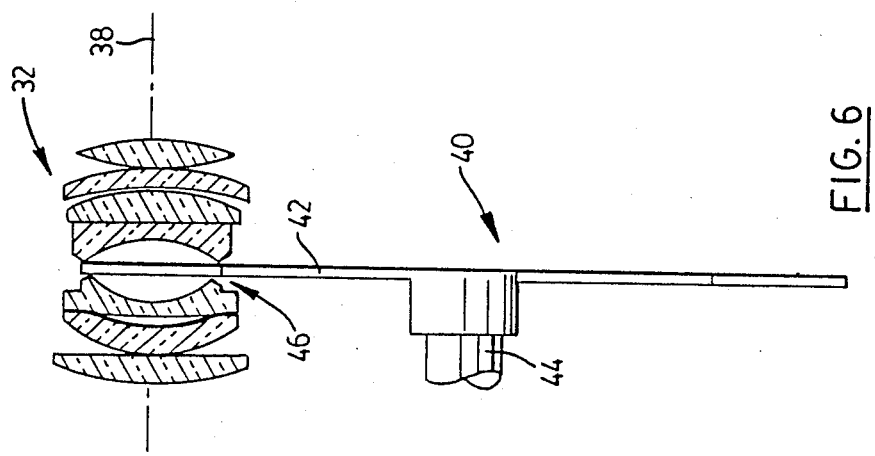
FIG. 6 is a diagrammatic plan view showing a rotary shutter positioned at the stop of a projection lens assembly in accordance with the invention.

Referring now to FIG. 6, reference numeral 32 denotes generally the projection lens assembly of the rolling loop projector shown in FIG. 1. FIG. 6 shows only the principal lens elements of assembly 32 and the optical axis of the assembly (denoted 38). In accordance with the invention, the projection lens 32 is modified by the addition of a rotary shutter generally indicated at 40. Shutter 40 comprises a generally disk-shaped blade 42 which is mounted on a shaft 44 parallel to the axis 38 of the projection lens assembly 32. Shaft 44 is driven from the projector drive system in synchronism with the rotation of rotor 22 (and hence movement of the primary shutters as shutter 36). Shutter 40 is positioned at the "stop" 46 of the projection lens assembly 32. As mentioned previously, the stop of the lens assembly is the location at which the bundle of light travelling through the assembly is at its smallest diameter. By locating the supplementary shutter at the stop, the shutter blade can then be a minimum size commensurate with rapid "chopping" of the projected light.

Figure 7:
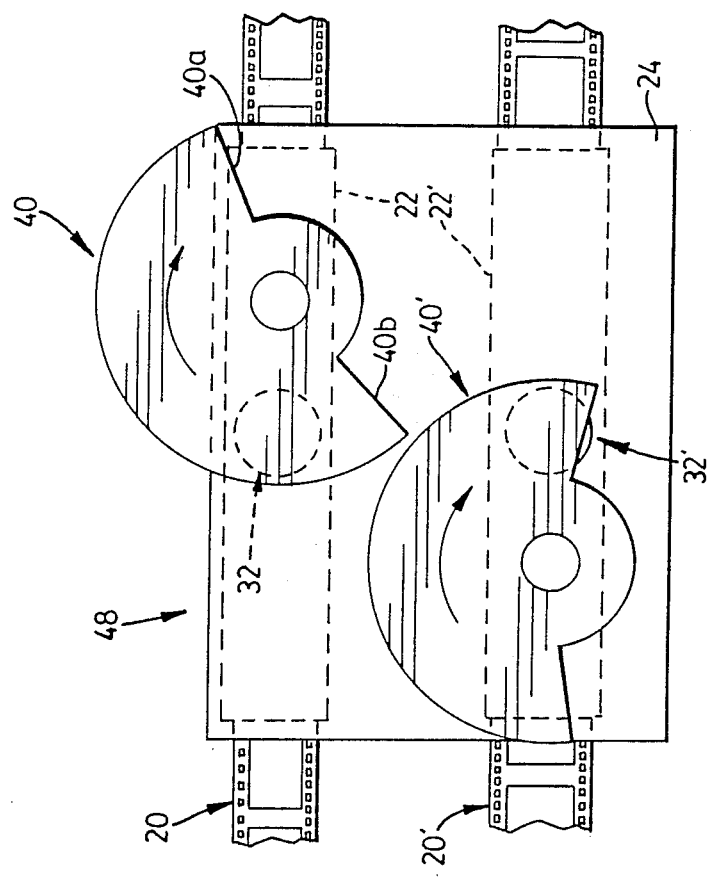
FIG. 7 is a diagrammatic front elevational view of a twin rotor rolling loop projector having a pair of projection lenses, each provided with a rotary shutter.

FIG. 7 diagrammatically illustrates two such shutters (denoted 40 and 40') associated with two projection lens assemblies (32 and 32' respectively) of a twin rotor rolling loop projector generally denoted 48. The projector is essentially similar to two conventional rolling loop projectors stacked one on top of the other. The projector has two rotors indicated at 22 and 22' respectively and a common stator 24. Stator 24 has two vertically aligned apertures (not shown) associated with the respective projection lens assemblies 32 and 32'. Two film strips that are transported through the projector are indicated respectively at 20 and 20'. The two rotors of the projector are driven together but slightly out of phase so that the images are projected alternately from the respective film strips.

The two supplementary shutters 40 and 40' are driven in synchronism with the rotors from the main drive system of the projector. Each shutter blade has "open" and "closed" sectors for respectively unblocking and blocking the projected light. The closed sectors (for example the sector defined by leading and trailing edges 40a and 40b respectively in the case of blade 40) each subtend an angle of slightly more than 180° at the axis of rotation of the blade. As such, each blade will obscure the projected light for slightly greater than one-half of each revolution of its drive shaft 44. The two shutters are synchronized with one another so that one shutter does not start to uncover the light being projected through the associated projection lens until the other shutter has completely cut off the light being projected through the other projection lens. Thus, in FIG. 7, shutter 40' is about to complete the cut-off of light through projection lens assembly 32' while shutter 40 is about to uncover lens assembly 32.

Figure 8:
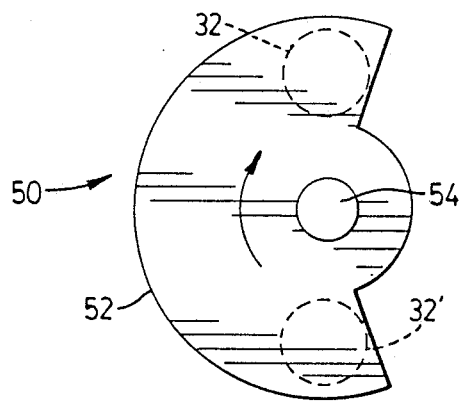
FIG. 8 is a view similar to FIG. 7 but showing one form of single disk shutter for both lenses.

FIG. 8 illustrates the use of a differently shaped single shutter blade in association with the two projection lens assemblies 32 and 32'. In that view (and in FIGS. 9a and 10a) only the projection lens assemblies have been indicated; the remainder of the projector has not been shown.

The shutter of FIG. 8 is generally indicated by reference numeral 50 and again comprises a blade 52 mounted on a driven rotary shaft 54. The closed sector of blade 52 occupies an arc length which is dependent on the diameter of the light bundles which must be blocked; this dimension can vary depending upon the design of the lenses and the internal geometry of the lamphouse. In the embodiment of FIG. 8 the closed arc length of blade 52 corresponds to 50% of the total circumference plus the angle required to overlap the light bundles.

Figures 9A, 9B:
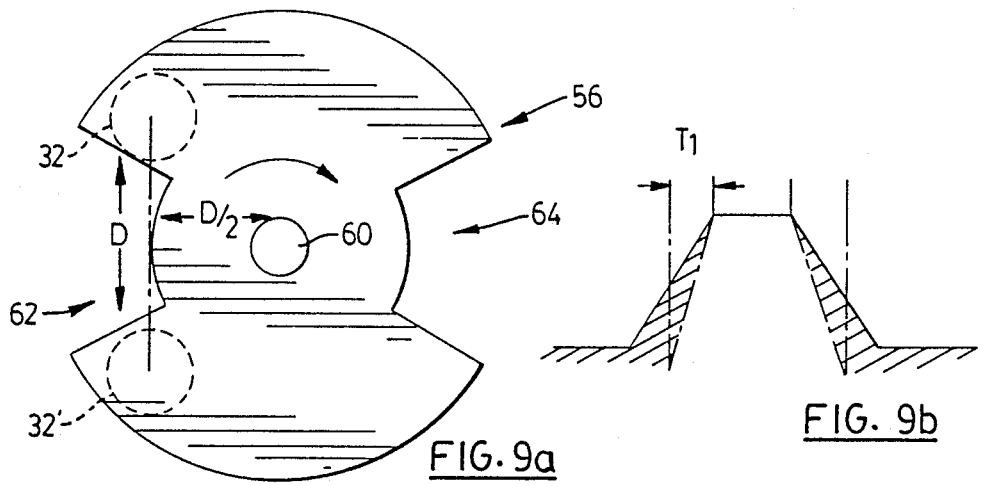

FIG. 9a illustrates an alternative blade configuration for a single shutter used to trim the light projected through two projection lens assemblies. In this case, the shutter is denoted 56 and has a blade 58 mounted on a driven shaft 60. In this case, the blade 58 is shaped with two open sectors 62 and 64 so that each lens assembly is exposed for projection twice during one revolution of the shutter blade. This allows the blade to be rotated at half speed as compared with the blade of the shutter of FIG. 8 (typically 24 revolutions per second as compared with 48).

FIG. 9b shows a portion of the light intensity versus time graph (similar to FIG. 5) that would be obtained using the shutter blades of FIGS. 9a. The shaded area represents the light "trimmed" by the shutter and the time period denoted $T_1$ indicates the time required by the shutter to completely cover or uncover the light bundle.

Figures 10A, 10B:
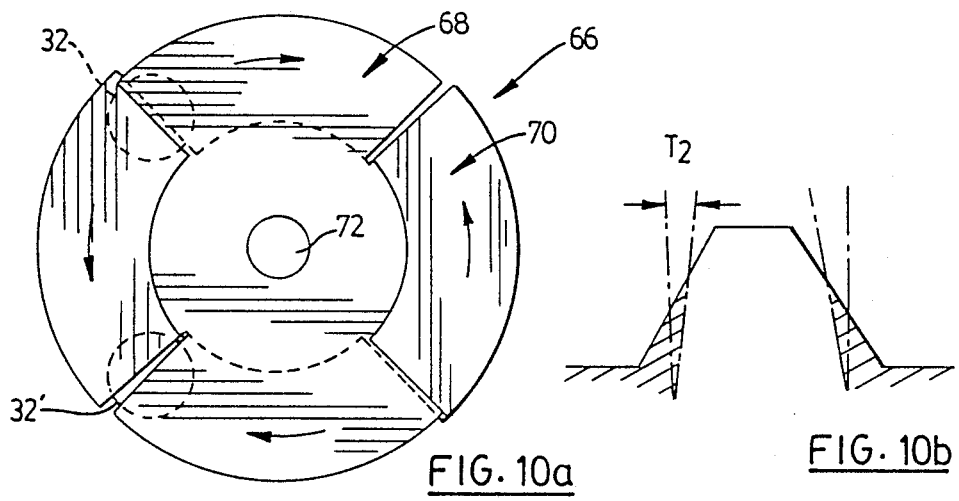
FIGS. 10a and 10b are views similar to FIGS. 9a and 9b respectively illustrating two counter-rotating disk shutters.

FIG. 10a shows a further modification in which two counter-rotating shutters are used, each of the form shown in FIG. 9a. In this case, the shutter is denoted 66 and the two blades are indicated at 68 and 70. The two blades are mounted on a shaft 72 and driven in the opposite directions. This configuration reduces by half the time that is taken to cover or uncover the respective projected light bundles as compared with the embodiment of FIG. 9a. As can be seen from FIG. 10a, the leading edge of each shutter blade need move only to the centreline of each light bundle before the light is completely cut off because the two blades are rotating in opposite directions. FIG. 10b is a graph similar to FIG. 9b and shows this difference in cut off time $$\left(\frac{T_1}{2}\right).$$

The embodiments shown in FIGS. 9a and 10a have he advantage as compared with the preceding embodiments that the shutter blades are inherently balanced. The shutters of the preceding embodiments would have to be dynamically balanced.

A further advantage of the embodiments of FIGS. 9a and 10a is that the center of rotation of the shutter in each case is laterally displaced from the plane that bisects the two projection lenses. In fact, the center is offset from that plane along a line that is normal to that plane, by a distance equal to one half of the distance between the two lenses (as indicated in FIG. 9a). This allows the shutter drive mechanisms to be placed away from the lens housings in a more accessible and practical location. The blade diameters must be increased somewhat as compared with an arrangement in which the center of rotation is between the lenses but this in itself has the benefit that the "linear" speed of the shutter blade at the point of intersection with the light bundle is increased. This decreases the time which the blade takes to completely cover the light bundle. In turn, this increases the amount of light available for projection during the "open" portion of the shutter cycle.

Figure 11:
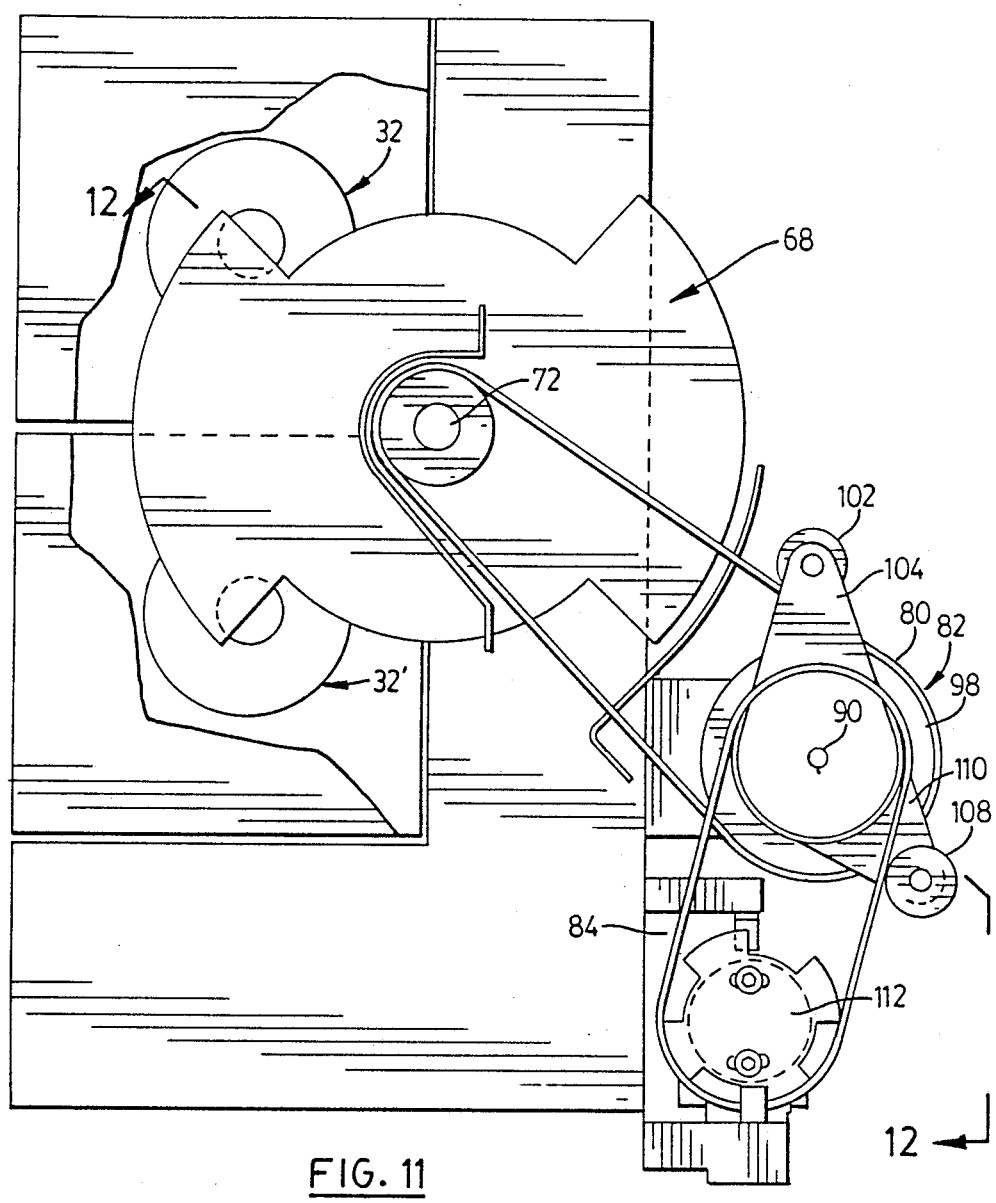
FIG. 11 is a front elevational view showing a practical arrangement for driving the shutter of FIG. 9a; and, FIG. 12 is a sectional view on line 12—12 of FIG. 11.
Figure 12:
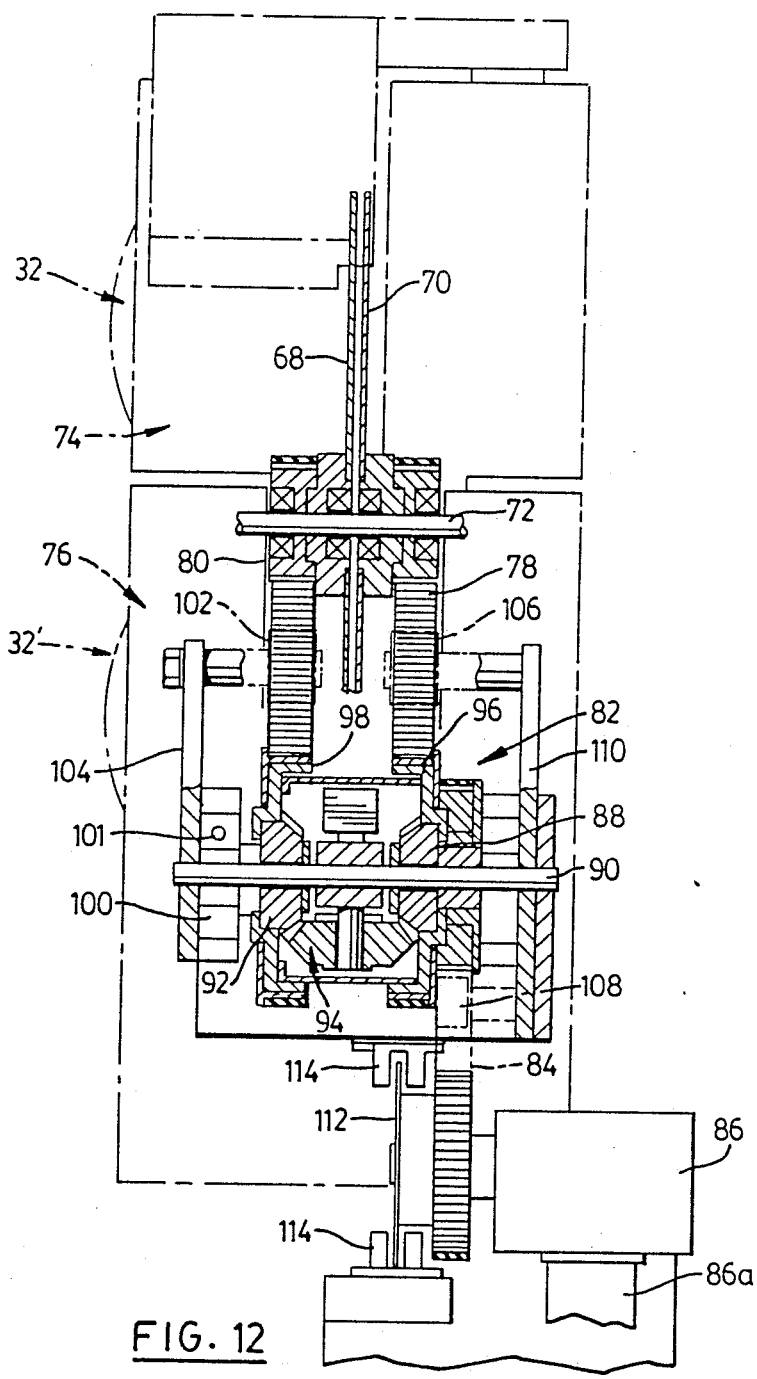

FIGS. 11 and 12 illustrate a drive mechanism for a twin blade shutter of the form shown in FIGS. 10a and 10b. The two blades are visible in FIG. 12 at 68 and 70 in association with respective housings 74 and 76 for the two projection lens assemblies 32 and 32' respectively. The two blades are journaled by bearings on a common shaft 72 and are driven in opposite directions by respective drive belts 78 and 80 from a differential drive mechanism 82 that is itself driven by a belt 84 from a gearbox 86. Gearbox 86 has an input shaft 86a connected to the main drive shaft of the projector.

As best seen in FIG. 12, belt 84 drives a crown gear 88 of mechanism 82. Gear 88 is mounted on a fixed spindle 90 that carries a second crown gear 92. A planetary cage which includes a mitre gear 94 couples the two crown gears and the crown gears carry externally toothed wheels (96, 98 respectively) that in turn drive the respective shutter driving belts 78 and 80. The planetary cage is fixed to spindle 90. Spindle 90 in turn extends through a fixed split yoke 100 which is clamped around spindle 90 by means of a clamp bolt 101. By loosening bolt 101, spindle 90 can be turned to adjust the position of cage 94 and thereby "fine tune" the shutters 68,70 with respect to one another.

FIG. 11 an shows idler roll 102 that bears on belt 80 for maintaining belt tension. The idler roll is carried by a lever 104 mounted on spindle 90. Belts 78 and 84 are also provided with respective tensioning idler rolls 106 and 108 which are carried at opposite ends of a double armed lever 110 also mounted on spindle 90 (FIG. 12).

FIG. 12 also shows a supplementary timing shutter 112 that is driven from gearbox 86. Associated with the shutter 112 are respective optical sensors 114 that generate electrical signals for synchronizing with the projector electro-optical shuttered glasses that are worn by viewers of the motion picture being projected, as discussed previously. The two sensors provide redundancy in case of a malfunction in one sensor.

It will of course be understood that the preceding description relates to particular preferred embodiments of the invention only and that many modifications are possible within the broad scope of the invention. For example, the supplementary shutter means of the invention may be located behind the projection lenses instead of at the lens stops as described.

We claim:

1. A 3-D motion picture projection apparatus for alternately projecting images from respective series of corresponding "left eye" and "right eye" images, the apparatus comprising:
   at least one rolling loop film transport mechanism which includes a stator having an aperture and a rotor co-operating with the stator to define a film passage and having gaps for receiving film loops;
   a light source;
   a projection lens assembly;
   at least one primary shutter coupled to said rotor and bridging a said gap for interrupting light from said source projected through said aperture as the rotor rotates; and,
   supplementary shutter means adapted to modify the shuttering effect of said primary shutter so that projection of light through each image in one said series is terminated before commencement of projection of light through the next succeeding image of the other series, whereby discrete "left eye" and "right eye" images are projected.

2. An apparatus as claimed in claim 1, wherein said supplementary shutter means is arranged to interrupt light passing through said projection lens assembly at a location in said assembly at which the projected light is at a minimum diameter.

3. An apparatus as claimed in claim 2, wherein said projection lens assembly extends about a longitudinal axis and wherein said supplementary shutter means comprises a rotary shutter including a blade rotatable about an axis parallel to said longitudinal axis of the projection lens assembly.

4. An apparatus as claimed in claim 1 including two said rolling loop film transport mechanisms and two projection lens assemblies associated one with each said mechanism, and wherein said supplementary shutter means is arranged to interrupt light passing through both of said assemblies in synchronism with the operation of the primary shutters of the respective rolling loop mechanisms.

5. An apparatus as claimed in claim 4, wherein each said lens assembly extends about a longitudinal axis and the assemblies are arranged with said axes generally parallel to one another, and wherein said supplementary shutter means comprises a rotary shutter having a blade rotatable about an axis parallel to said projection lens assembly axes.

6. An apparatus as claimed in claim 5, comprising a single said blade which is shaped to define two diametrally opposed closed sectors separated by corresponding open sectors and wherein the blade is symmetrical about a diametral line bisecting said closed sectors.

7. An apparatus as claimed in claim 6, wherein said rotary shutter comprises two said blades which are identical with one another and which are arranged to be driven in opposite rotational directions, the blades having respective leading edges that move towards one another and meet substantially on the centreline of each of said projection lens assemblies as the blades rotate in use.

8. An apparatus as claimed in claim 4, wherein said axis of rotation of the rotary shutter is offset from a plane bisecting the two projection lens assemblies.

9. An apparatus as claimed in claim 8, wherein said axis of rotation of the rotary shutter is offset along a line normal to said plane by a distance equal to half the distance between the longitudinal axes of the respective projection lens assemblies.

10. An apparatus as claimed in claim 7 further comprising drive means for rotating said blades in opposite directions, said drive means including a differential assembly for permitting angular adjustment of the blades with respect to one another.

11. An apparatus as claimed in claim 10, wherein said drive mechanism further comprises a timing shutter and an associated optical sensor for generating a synchronizing signal for glasses to be used with said apparatus.

12. In a 3-D motion picture projection apparatus for alternately projecting images from respective series of corresponding "left eye" and "right eye" images, the apparatus including at least one rolling loop film transport mechanism which includes a stator having an aperture and a rotor co-operating with the stator to define a film passage and having gaps for receiving film loops, a light source and a projection lens assembly;

the improvement comprising, in combination, at least one primary shutter coupled to said rotor and bridging a said gap for interrupting light from said source projected through said aperture as the rotor rotates, and supplementary shutter means adapted to modify the shuttering effect of said primary shutter so that projection of light through each image in one said series is terminated before commencement of projection of light through the next succeeding image of the other series, whereby discrete "left eye" and "right eye" images are projected.

* * * * *